US005162932A

United States Patent [19]

Kobayashi et al.

[11] Patent Number: 5,162,932

[45] Date of Patent: Nov. 10, 1992

[54] METHOD OF DRIVING A LIQUID CRYSTAL DISPLAY WITH MINIMUM FREQUENCY VARIATION OF PIXEL VOLTAGE

[75] Inventors: Yoshinori Kobayashi, Hirakata; Yoshihiro Gohara, Toyono; Shozo Fujiwara, Ibaraki, all of Japan

[73] Assignee: Matsushita Electric Industrial Co., Ltd., Osaka, Japan

[21] Appl. No.: 599,359

[22] Filed: Oct. 18, 1990

[30] Foreign Application Priority Data

Oct. 18, 1989 [JP] Japan .......................... 1-270656

[51] Int. Cl.[5] .................... G02F 1/133; G09G 3/36

[52] U.S. Cl. .................................. 359/55; 359/85; 340/784

[58] Field of Search .................. 350/331 R, 332, 333; 340/784, 805, 793, 765

[56] References Cited

U.S. PATENT DOCUMENTS

| | | | |
|---|---|---|---|
| 4,180,813 | 12/1979 | Yoneda | 350/333 |
| 4,413,256 | 11/1983 | Yasuda et al. | 340/784 |
| 4,427,979 | 1/1984 | Clerc et al. | 350/332 |
| 4,645,303 | 2/1987 | Sekiya et al. | 350/332 |
| 4,649,383 | 3/1987 | Takeda et al. | 340/805 |
| 4,752,774 | 6/1988 | Clerc et al. | 340/784 |
| 4,872,059 | 10/1989 | Shinabe | 340/784 |
| 4,926,168 | 5/1990 | Yamamoto et al. | 340/784 |
| 5,010,326 | 4/1991 | Yamazaki et al. | 340/784 |

FOREIGN PATENT DOCUMENTS

| | | | |
|---|---|---|---|
| 60-19195 | 1/1985 | Japan . | |
| 60-19196 | 1/1985 | Japan . | |
| 0120327 | 6/1985 | Japan | 350/332 |
| 0102230 | 5/1987 | Japan | 350/332 |

OTHER PUBLICATIONS

Cross–Modulation and Nonuniformity Reduction in the Addressing of Matrix Displays, P. Maltese, Proceedings of the SID, vol. 26/2, 1985, pp. 125–132.

Crosstalk–Free Driving Methods for STN–LCDS, Yoshiya Kaneko et al., Fujitsu Laboratories Ltd., Atsugi, Japan, SID 90 Digest pp. 412–415.

*Primary Examiner*—Stanley D. Miller
*Assistant Examiner*—Tai V. Duong
*Attorney, Agent, or Firm*—Wenderoth, Lind & Ponack

[57] ABSTRACT

In a method of driving a liquid crystal matrix panel, the number of shifts of a voltage applied to each signal electrode from an ON level to an OFF level and vice versa is minimized in variation so that variation in the polarity inversion (or frequency) of a (driving) voltage applied to a corresponding pixel can be controlled. Accordingly, the disturbing effect of electrode resistance and liquid crystal capacitance can be reduced and thus, the uniformity of display will be ensured.

3 Claims, 14 Drawing Sheets

| OUTPUT OF LATCH 320 | SIGNAL DF | OUTPUT OF MULTIPLEXER 350 |
|---|---|---|
| 0 | 0 | 2/a $V_0$ |
| | 1 | (1-2/a)$V_0$ |
| 1 | 0 | 0 |
| | 1 | $V_0$ |

METHOD OF DRIVING A LIQUID CRYSTAL DISPLAY WITH MINIMUM FREQUENCY VARIATION OF PIXEL VOLTAGE

BACKGROUND OF THE INVENTION

1. Field of the Invention

The present invention relates to a method of driving a matrix type liquid crystal display.

2. Description of the Prior Art

The demand for large-screen thin type visual displays has increased, particularly in the industries of information equipment, such as computers, video equipment, and television receivers. For driving a known matrix type liquid crystal display, a voltage averaging method is commonly employed in which an effective voltage applied to a pixel during a non-selection period is constant (for example, as described in Japanese Patent Laid-open Publications No. 50-68419 (1975) and No. 55-140889 (1980).

Such a conventional driving method will be described below referring to the accompanying drawings.

FIGS. 1*a* and 1*b* are schematic views showing a liquid crystal display, in which scanning electrodes Y1, Y2, Y3, Y4, Y5, Y6, . . . , YN coupled to a scanning line driver 100 and signal electrodes X1 and X2 coupled to a signal line driver 101 are arranged in a matrix form for constituting an array of pixels. FIG. 2*a* shows a waveform diagram of driving voltages applied for displaying a pattern illustrated in FIG. 1*a* (in which the hatched pixels are OFF and the remaining pixel are ON). Shown in FIG. 2*a* are the waveforms of the respective voltages; $V_{Y2}$ applied to the scanning electrode Y2, $V_{X1}$ and $V_{X2}$ applied to the signal electrodes X1 and X2 respectively, and $V_{111}$ and $V_{112}$ (difference voltages between the scanning and signal electrode voltages) applied to pixels 111 and 112, respectively.

It is known that the amount of transmitted light across a twisted nematic liquid crystal panel, which is one of the most typical matrix liquid crystal panels, corresponds to an effective value of the voltage applied thereto. As illustrated in FIG. 2, denoting the scanning period is T, the number of scanning lines as N, the maximum voltage to be applied as $V_O$, and the bias ratio as a, the effective voltages $V_{NS}$ and $V_S$ applied to the OFF and ON pixels, respectively, are expressed as:

$$V_{NS} = \frac{V_0}{a}\sqrt{\frac{1}{N}\{(a-2)^2 + N - 1\}} \qquad (1)$$

$$V_S = \frac{V_0}{a}\sqrt{\frac{1}{N}\{a^2 + N - 1\}} \qquad (2)$$

Also, FIG. 2*b* is a waveform diagram of driving voltages for exhibiting the pattern of intermediate gradation display illustrated in FIG. 1*b*. Denoting the scanning period as T, the period for applying an ON voltage [0, $V_O$] during the scanning with a signal electrode voltage as $T_S$, the period of applying an OFF voltage [(2/a)$V_O$, (1−2/a)$V_O$] during the same as $T_{NS}$, the number of scanning lines as N, the maximum voltage to be applied as $V_O$, and the bias ratio as a, the effective voltage V applied to a pixel is expressed by:

$$V = \frac{V_0}{a}\sqrt{\frac{1}{N}\{ma^2 + (1-m)(a-2)^2 + N - 1\}} \qquad (3)$$

(where $m = T_S/T$). Hence, the intermediate gradation pattern can be displayed by changing the duration of the selection voltage application and the duration of the bias voltage application in accordance with the gradation level (with the equation (1) if M=0 and (2) if M=1).

However, in the conventional method, the actual voltage applied to a corresponding pixel is affected by the presence of electrode resistance and liquid crystal capacitance, and thus exhibits a distorted waveform represented by the dotted line of FIG. 2*a* or 2*b*. FIG. 3 illustrates the waveform of a voltage distorted by inversion of the voltage polarity during the non-selection period. Hence, $V_{NS}$ and $V_S$ are altered from the equations (1) and (2)and are instead represented as:

$$V_{NS} = \frac{V_0}{a}\sqrt{\frac{1}{N}\{(a-2)^2 + N - 1 - \tau n\}} \qquad (4)$$

$$V_S = \frac{V_0}{a}\sqrt{\frac{1}{N}\{a^2 + N - 1 - \tau n\}} \qquad (5)$$

where a portion a of the distorted waveform, denoted by the dotted line in FIG. 3, is linearly approximated to a line b, and T is the time required for b to become (1/a)$V_O$ or −(1/a)$V_O$ and n is the number of voltage changes from (1/a)$V_O$ to −(1/a)$V_O$ and from −(1/a)$V_O$ to (1/a)$V_9$ (with 0≦n≦N−1) in one field $T_F$.

Similarly, the effective voltage V is now altered from the equation (3) to:

$$V = \frac{V_0}{a}\sqrt{\frac{1}{N}\{ma^2 + (1-m)(a-2)^2 + N - 1 - \tau n\}} \qquad (6)$$

(where $m = T_S/T$ and 0≦n≦2N−2). As is understood from the above, the effective voltage which is applied to each of the pixels having a same light transmittance, as shown in FIG. 2*a*, is varied by the values of t and n, thus preventing uniformity in the display and also causing the amount of transmitting light across the pixel to change adversely. This phenomenon will be emphasized in the display of intermediate gradation pattern with pulse width modulation as explained in FIG. 2*b*. Accordingly, as a voltage applied to a corresponding pixel is biased due to the presence of electrode resistance and liquid crystal capacitance, its waveform which varies corresponding to a pattern to be displayed and will be distorted more or less. Then, while the driving voltage becomes higher in frequency as the quality of the display is enhanced, the distortion in the waveform cannot be disregarded in order to provide a uniform display.

SUMMARY OF THE INVENTION

A primary object of the present invention is to provide an improved driving method in which the adverse effect of electrode resistance and liquid crystal capacitance is reduced.

For achievement of the aforementioned object, the present invention provides a method having first mode in which a period of applying an ON or OFF voltage to a signal electrode is allocated to the beginning part of a scanning period and a second mode in which the period of applying the ON or OFF voltage to the signal electrode is allocated to the end part of the scanning period, wherein the first and second modes occur alternately at intervals of a specific number of scanning periods, thereby reducing the variations of the number of changes of the voltage applied to the signal electrode from ON to OFF or vice versa in one field and reducing the number of changes itself.

Accordingly, a variation in the frequency of a voltage applied to each pixel can be minimized and also, the frequency itself can be lowered. As the result, a uniform display pattern will be exhibited without the disturbing effects of electrode resistance and liquid crystal capacitance.

PREFERRED EMBODIMENTS OF THE INVENTION

Figure 1A:
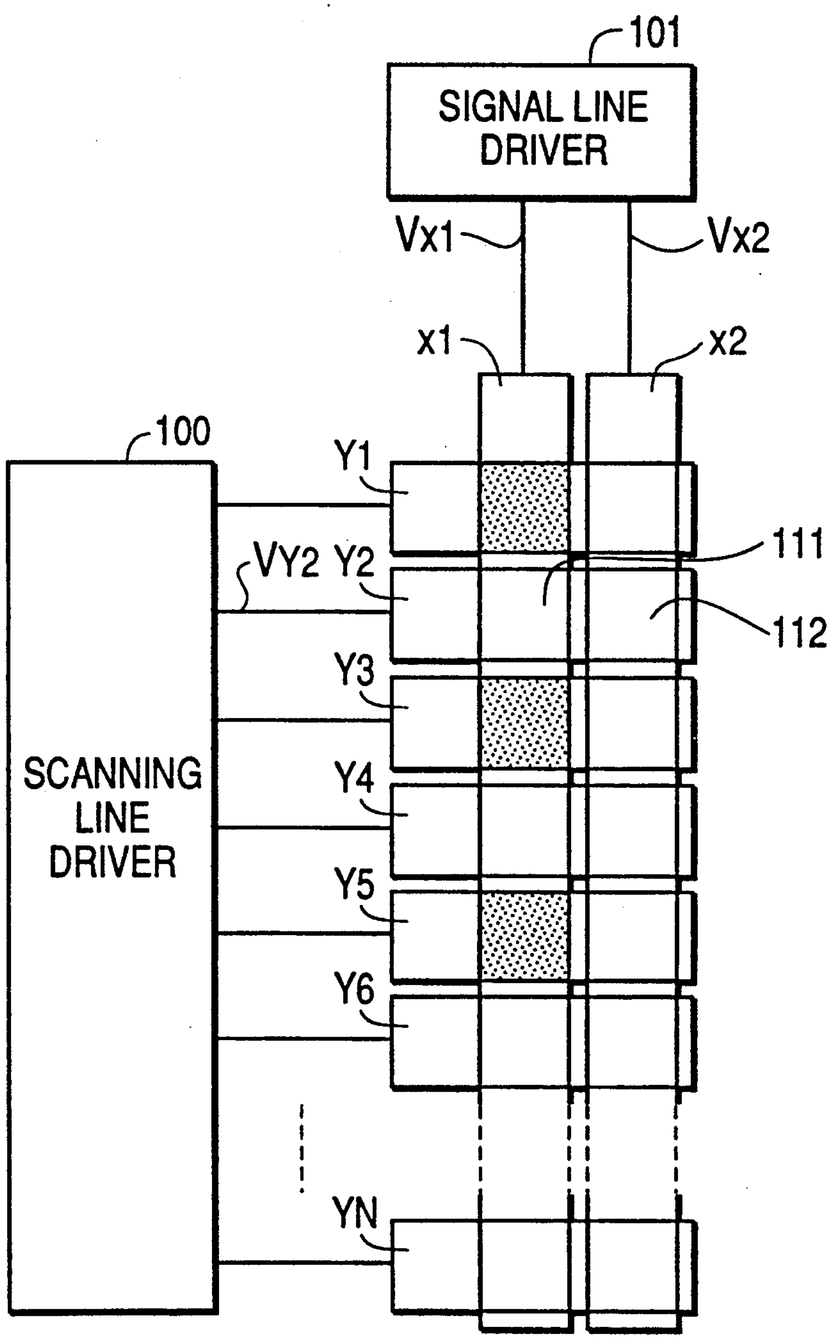
FIGS. 1*a* and 1*b* are schematic views showing a liquid crystal display.
Figure 1B:
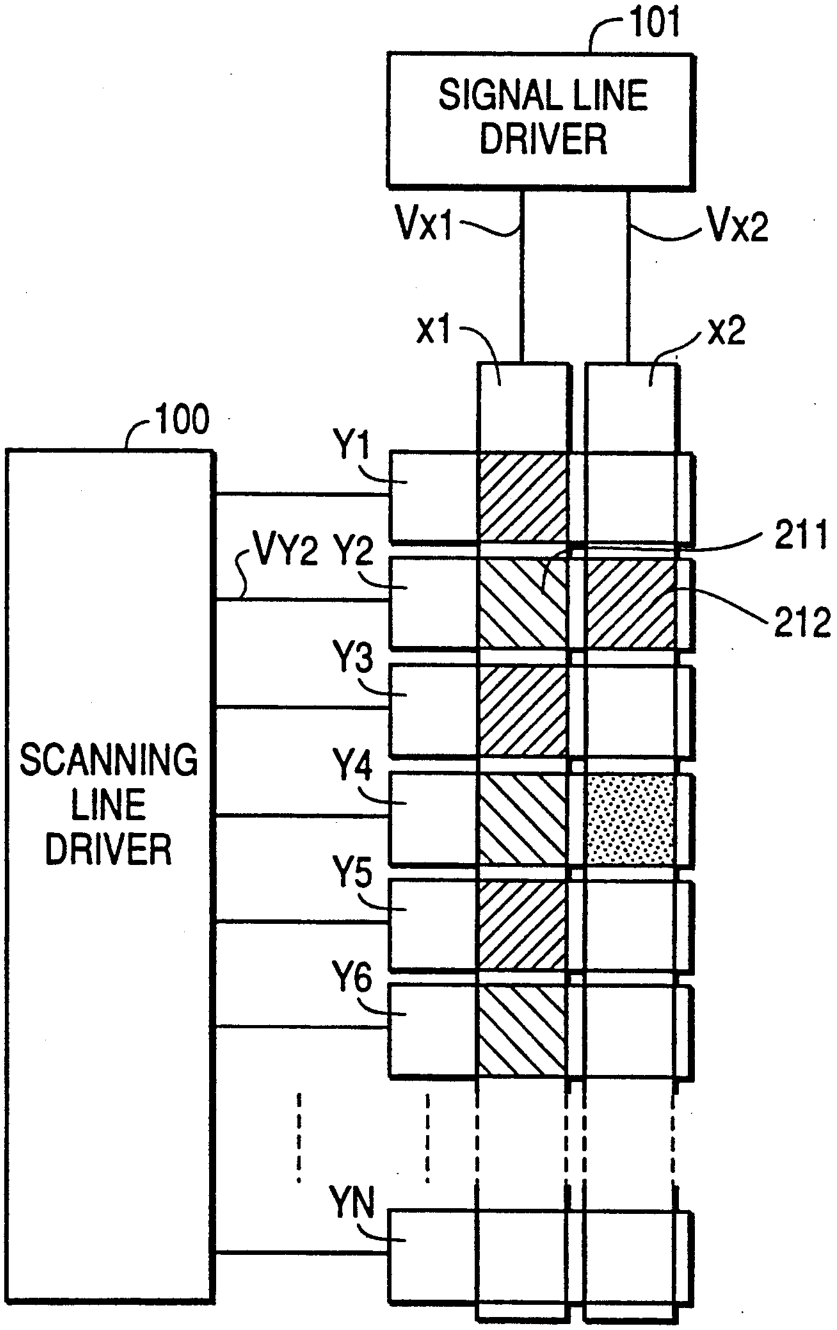
Figure 2A:
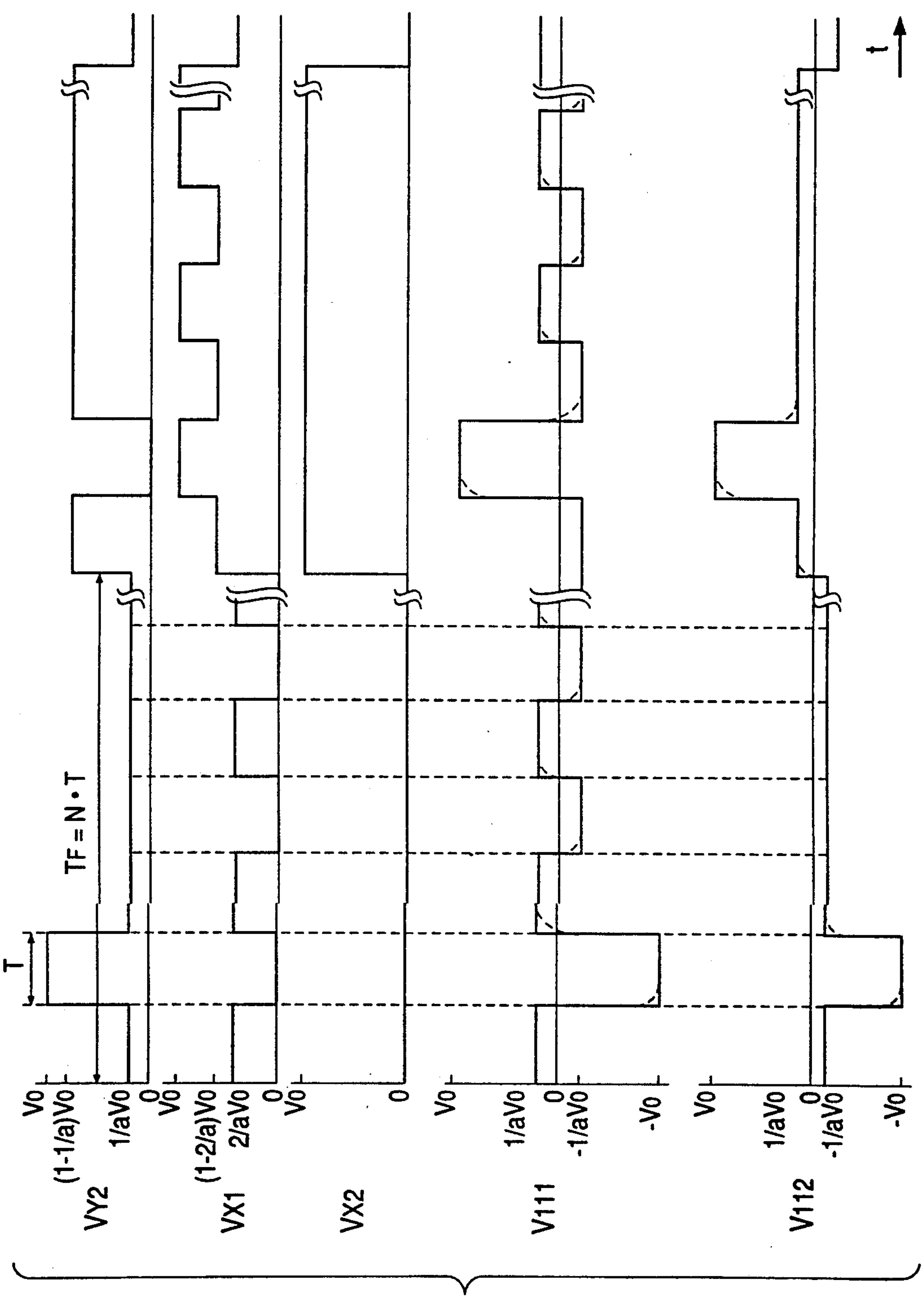
FIGS. 2*a* and 2*b* are waveform diagrams of driving voltages according to the prior art.
Figure 2B:
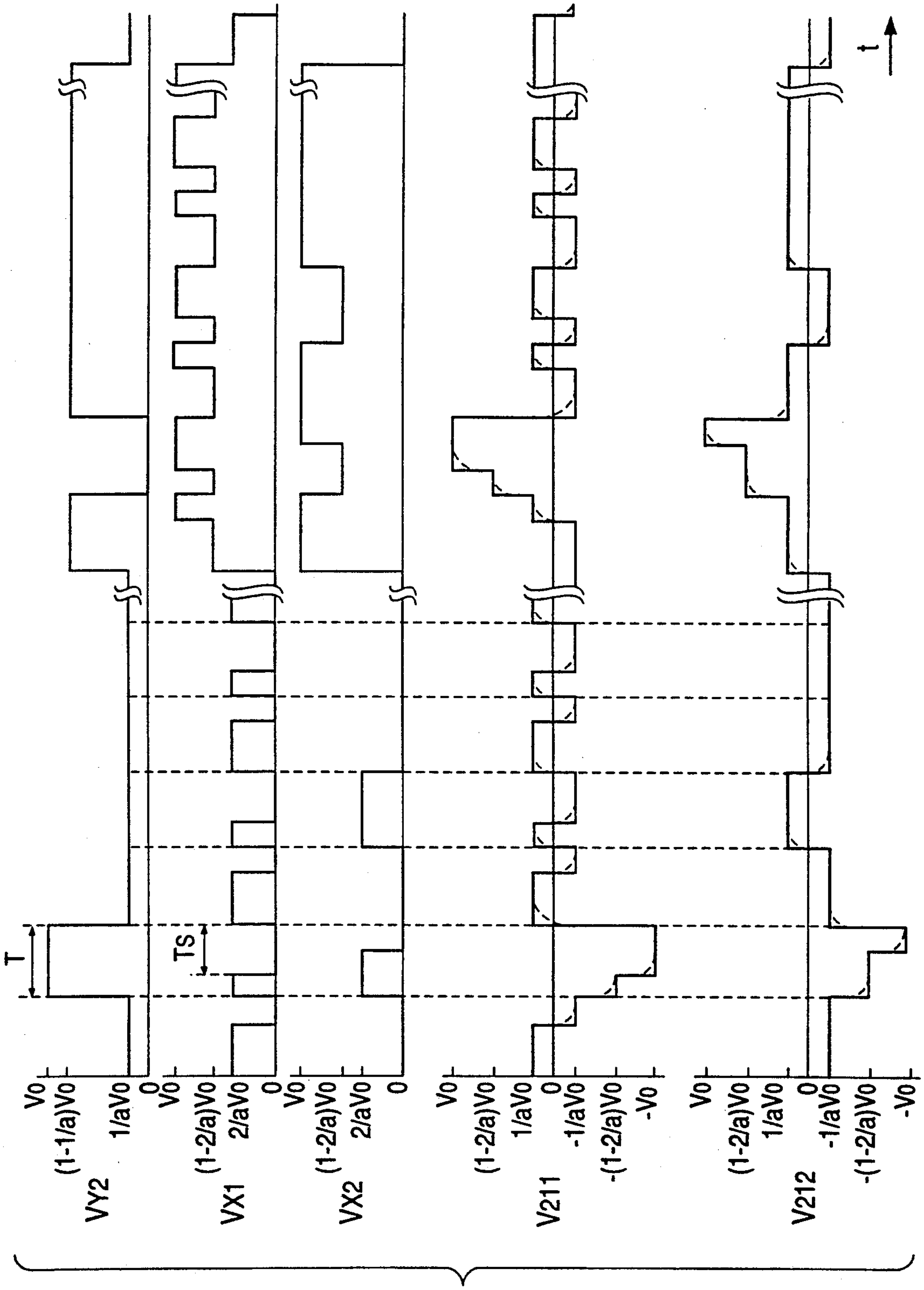
Figure 3:
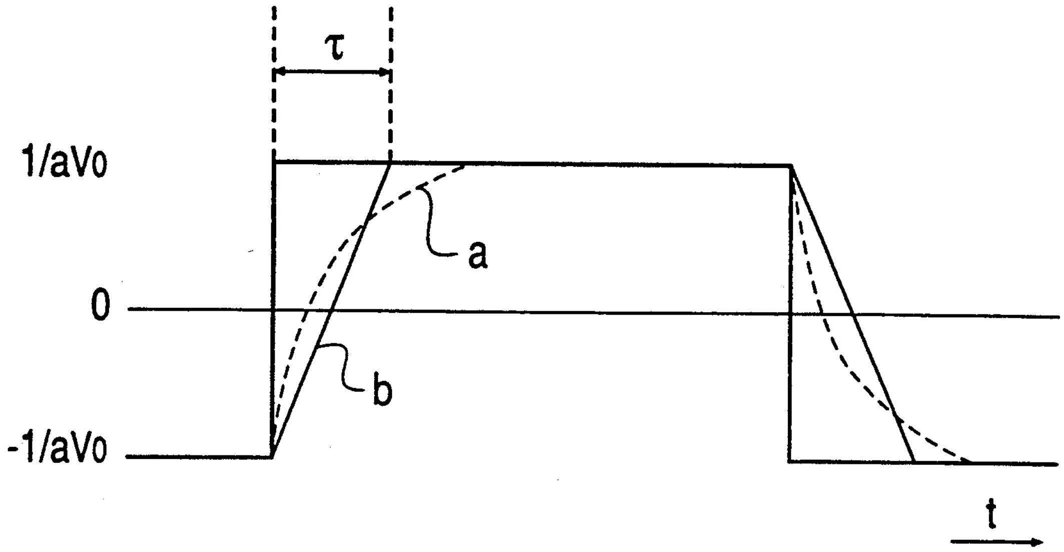
FIG. 3 is a diagram showing the waveform of a voltage distorted by the inverse of the voltage polarity during a non-selection period.
Figure 4:
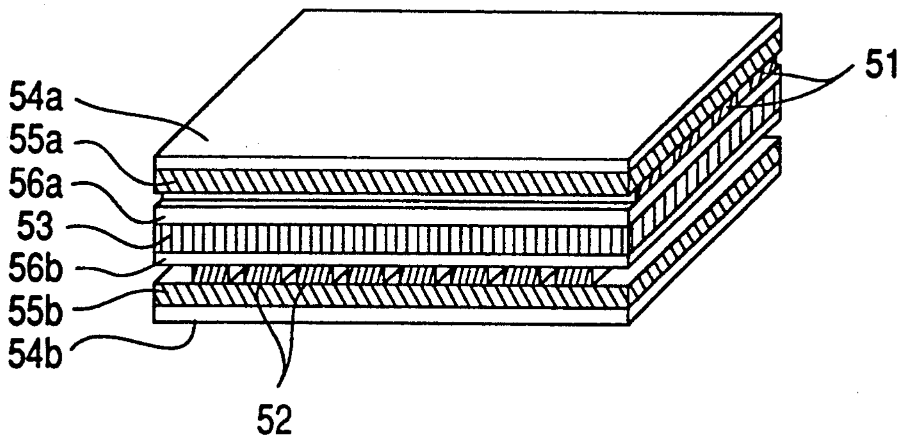
FIG. 4 is a view showing the arrangement of a liquid crystal matrix panel.

FIGS. 1*a* and 1*b* are schematic views showing a liquid crystal display which comprises a liquid crystal matrix panel 50 having scanning electrodes Y1, Y2, Y3, Y4, Y5, Y6,. . . ,YN and signal electrodes X1 and X2 arranged in a matrix form for providing an array of pixels, a scanning line driver 100, and a signal line driver 101. As best shown in FIG. 4, the liquid crystal matrix panel 50 consists primarily of, from the top, a glass substrate 55*a*, a scanning electrodes array 51 of transparent conductive film arranged in a pattern beneath the glass substrate 55*a*, an orientation layer (of orientated organic polymer film) 56*a* arranged beneath the electrodes array 51, and similarly, from the bottom, a glass layer 55*b*, a signal electrodes array 52 of transparent conductive film 52 arranged in a pattern on the glass substrate 55*b*, an orientation layer 56*b* arranged over the electrode array 52, and a liquid crystal layer 53 arranged between the two orientation layers 56*a* and 56*b*. There are also provided polarizer plates 54*a* and 54*b* on the outside of the glass substrates 55*a* and 55*b* respectively. The liquid crystal 53 can exhibit ON and OFF patterns determined by the molecular orientation in combination with the polarizer plates 54*a* and 54*b*.

EMBODIMENT 1

Figure 5:
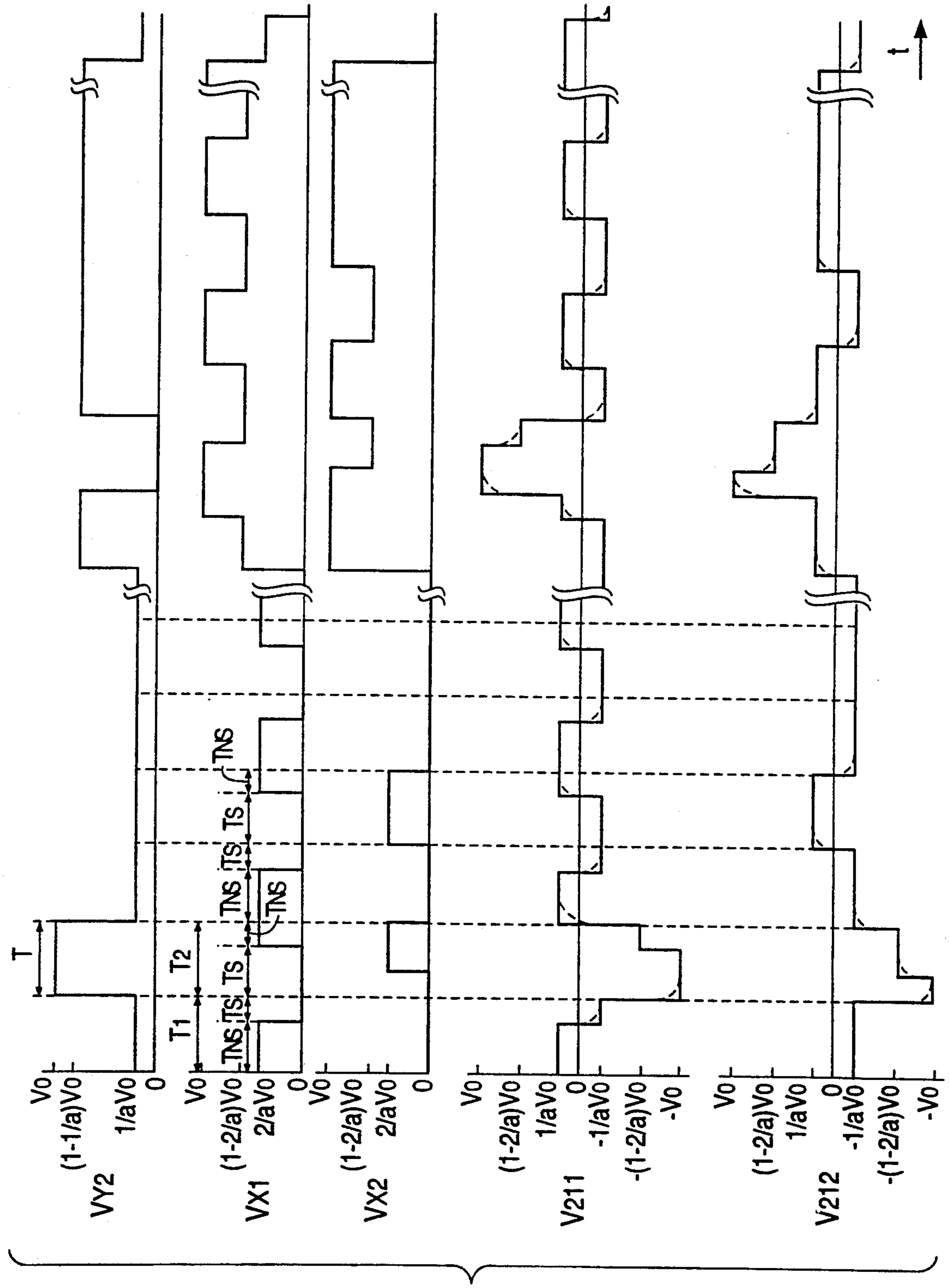
FIG. 5 is a waveform diagram of driving voltages according to a first embodiment of the present invention.

FIG. 5 is a waveform diagram of driving voltages applied for displaying the pattern illustrated in FIG. 1*b* according to a first embodiment of the present invention. For application of voltages $V_{X1}$ and $V_{X2}$ to the signal electrodes X1 and X2, respectively, the ON and OFF voltages are alternately applied corresponding to the level of intermediate gradation to be displayed so that the ON voltage application period $T_S$ and the OFF voltage application period $T_{NS}$ alternate with each other in every scanning period T. For example, the ON voltage and then, the OFF voltage are applied in the first scanning period $T_1$ and the ON voltage follows the OFF voltage in the next scanning period $T_2$. The ON voltage application period $T_S$ is allocated to alternate front and rear partitions of each scanning period T, and the voltages $V_{211}$ and $V_{212}$ applied to the pixels 211 and 212 appear as shown in FIG. 5. Hence, the effective voltage V applied to a corresponding pixel is obtained from:

$$V = \frac{V_0}{a}\sqrt{\frac{1}{N}\left\{ma^2 + (1-m)(a-2)^2 + N - 1 - \frac{1}{2}\tau n\right\}} \qquad (7)$$

(where $m = T_S/T$ and $0 \leqq n \leqq 2N-2$) in which the term (containing t) representing a voltage loss caused by waveform distortion is decreased to a half (tn/2) as compared with the equation (6). Then, the variation in the frequency of the driving voltage depending on the form of a display pattern becomes equal to that involving no intermediate gradation.

Figures 6A, 7:
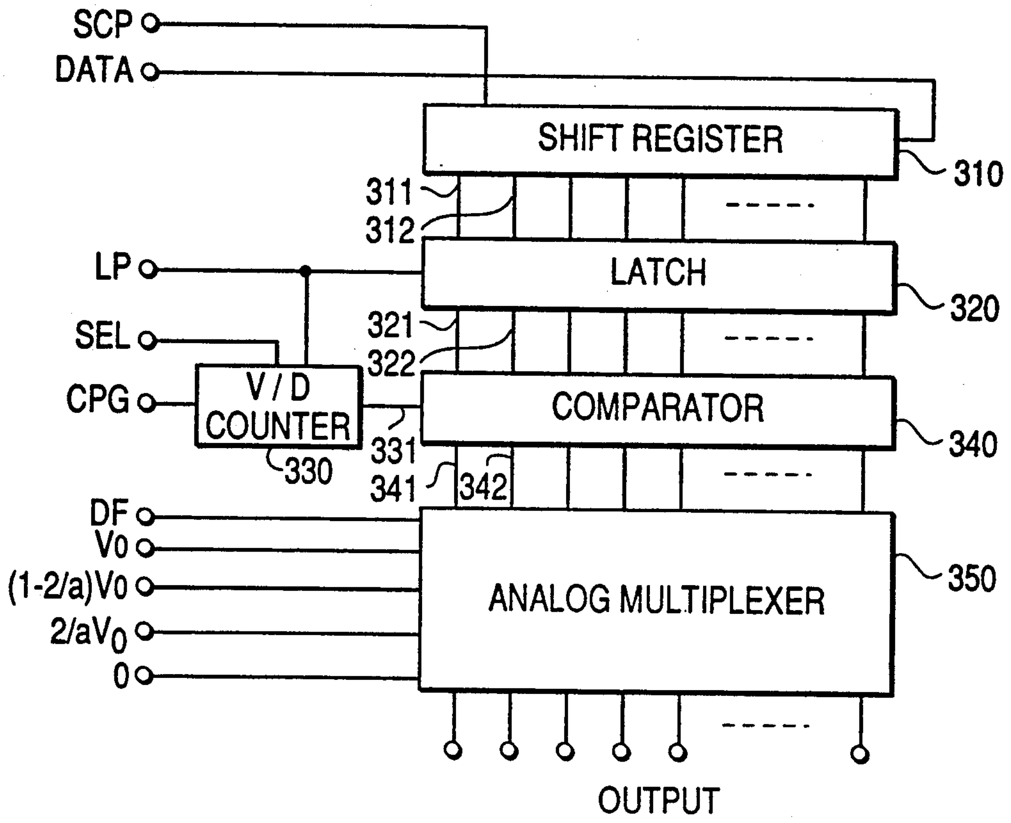
FIG. 6*a* is a block diagram showing a signal line driver of the first embodiment of the present invention.
FIG. 7 is a truth table of an analog multiplexer in the signal line drivers illustrated in FIGS. 6*a*, 9*a*, and 11*a;*
Figure 6B:
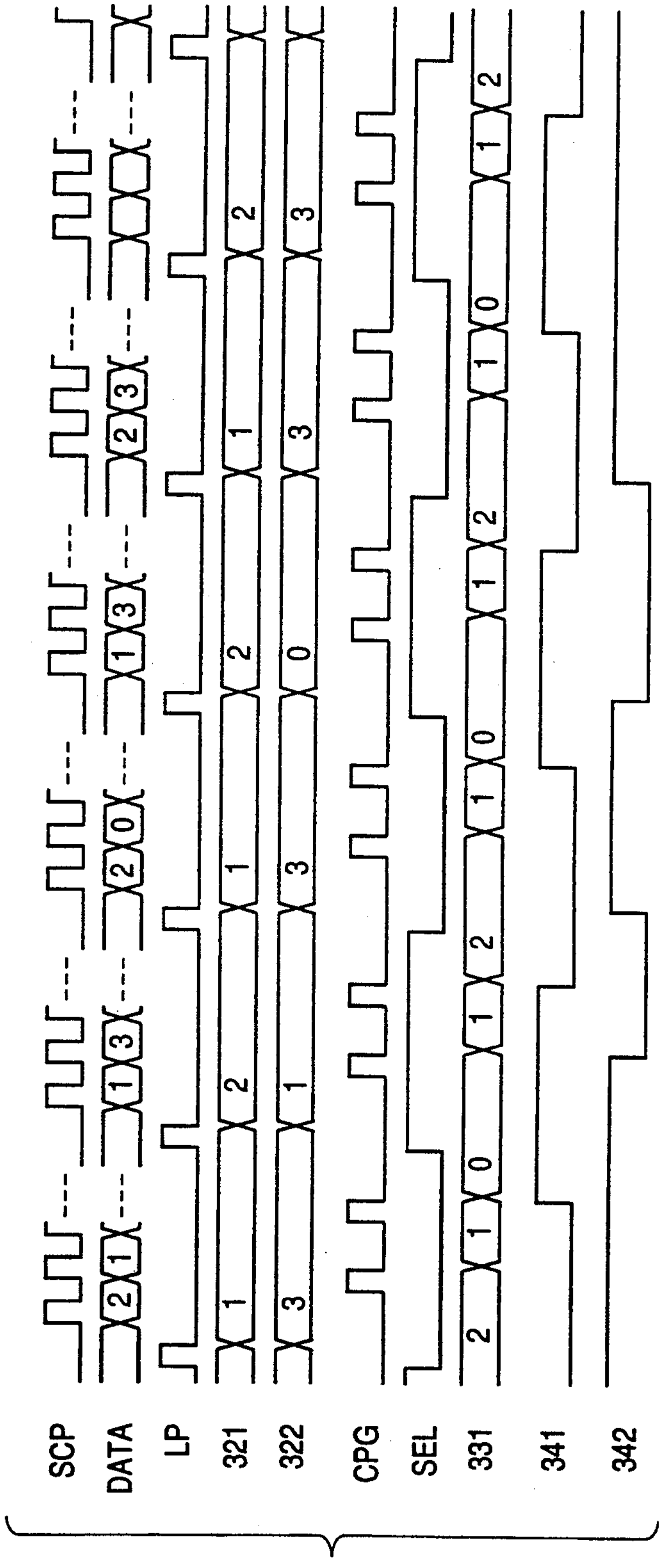
FIG. 6*b* is a timing chart for explaining the operation of the signal line driver shown in FIG. 6*a;*

FIG. 6*a* is a block diagram showing a signal line driver according to the first embodiment of the present invention and FIG. 6*b* is a timing chart of the operation of the same. The signal line driver comprises a shift register 310 for sequentially shifting display data, denoted by DATA, in response to a shift clock SCP, a latch 320 for fetching the output data from the shift register 310 upon receiving a latch signal LP, a counter 330 for counting up or down gradation control signals CPG according to an up/down selection signal SEL, a comparator 340 for judging that the output data of the latch 320 is greater than that of the counter 330, and an analog multiplexer 350 for selecting one of four driving voltages [0, $(2/a)V_O$, $(1-2/a)V_O$, $V_O$] in accordance with the combination of a data output of the comparator 340 and a polarity inversion signal DF and with reference to a truth table shown in FIG. 7. The waveform of the driving voltages illustrated in FIG. 5 can be realized by alternating the up/down selection signals SEL every scanning period. Although the ON voltage application period $T_S$ is changed over from the front portion to the rear portion or vice versa, in each scanning period according to the first embodiment, its change interval is not limited to one scanning period but may be plural scanning periods. Also, with the use of illuminated and non-illuminated fields in combination which are employed as display units, the level of intermediate gradation to be displayed can be enhanced.

EMBODIMENT 2

Figure 8:
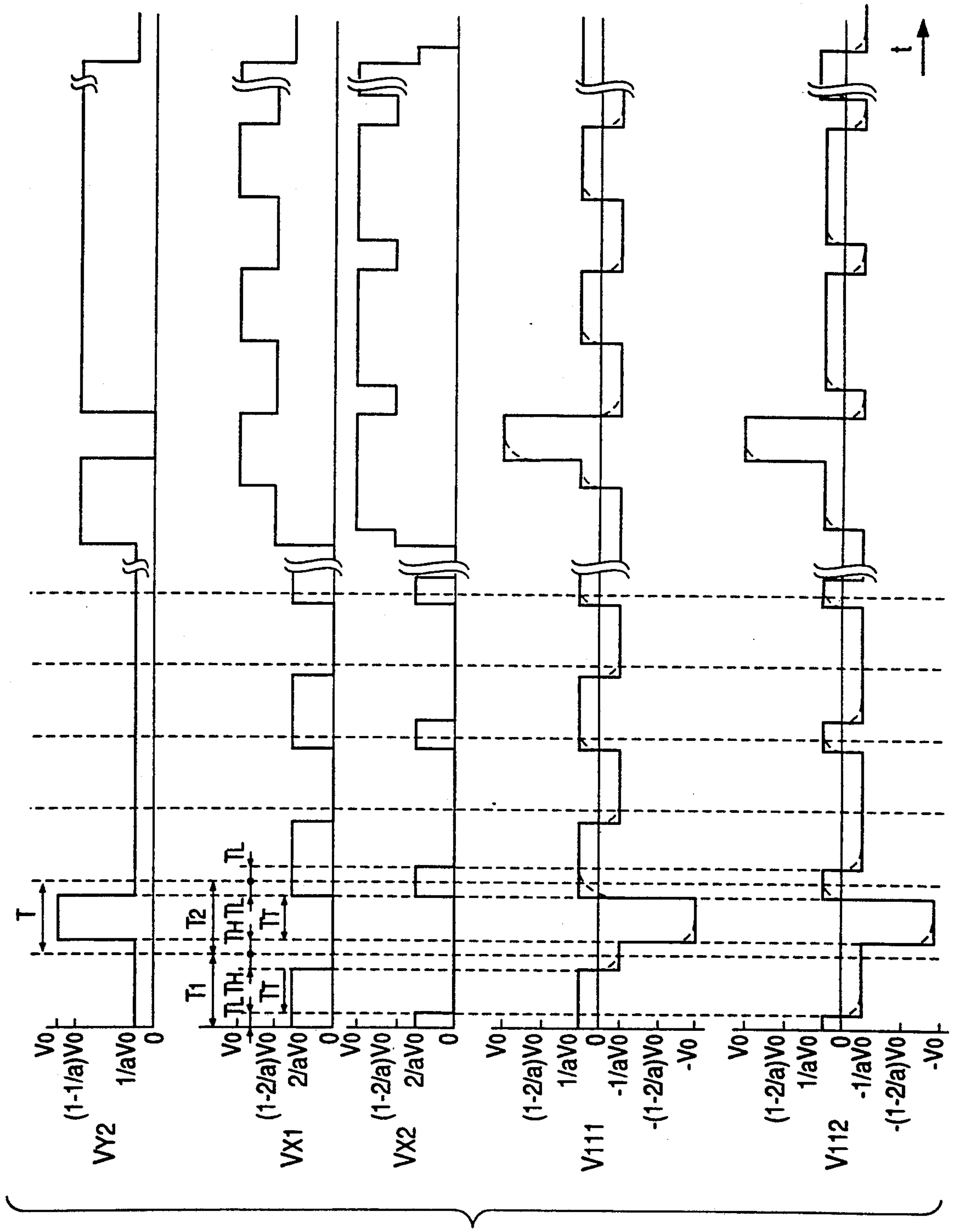
FIG. 8 is a waveform diagram of driving voltages according to a second embodiment of the present invention.

FIG. 8 is a waveform diagram of driving voltages applied for displaying the pattern of FIG. 1*a* according to a second embodiment of the present invention. The voltages $V_{X1}$ and $V_{X2}$ are applied to the signal electrodes X1 and X2, in which during the scanning period $T_1$, an OFF voltage is first applied for a period $T_L$ regardless of the display data, then either an ON or OFF voltage is applied for a period $T_T$ in accordance with the display data, and then an ON voltage is applied for a period $T_H$ regardless of the display data. During the next scanning period $T_2$, an ON voltage is applied for the period $T_L$ regardless of the display data, then either am ON or OFF voltage is applied for the period $T_T$ in accordance with the display data, and finally, an OFF voltage is applied for the period $T_L$ regardless of the display data. Similarly, during each scanning period T, both the ON voltage application period $T_H$ and the OFF voltage application period $T_L$ are included in the signal electrode applying voltage regardless of the display data and also, alternated with each other with respect to time. Hence, the voltages $V_{111}$ and $V_{112}$ applied to the pixels 111 and 112 are as shown in FIG. 8. Accordingly, the change of the signal electrode application voltage during one scanning period T can be limited to one regardless of the display data. Also, when the voltage applied to the scanning electrode is a non-selection voltage $[(1/a)V_O, (1-1/a)V_O]$ during both the periods $T_H$ and $T_L$ and a selection voltage $[0, V_O]$ during the period $T_T$ (where $T=T_H+T_L+T_T$), a ratio of V/V will be decreased. Accordingly, the polarity inversion of each voltage applied to a corresponding pixel during one scanning period T can be limited to one regardless of the display data. The effective voltages $V_{NS}$ for an OFF pixel and $V_S$ for an ON pixel are thus obtained respectively from:

$$V_{NS} = \frac{V_0}{a}\sqrt{\frac{1}{N}\{p(a+2)^2 + 1 - p + (1-\tau)N - 1\}} \tag{8}$$

$$V_S = \frac{V_0}{a}\sqrt{\frac{1}{N}\{pa^2 + 1 - p + (1-\tau)N - 1\}} \tag{9}$$

(where $p=T_T/T$). The number n of polarity inversions in the driving voltage, contained in the equations (4) and (5), is now expressed by N which is constant regardless of the display data. More specifically, the effective voltage applied to a corresponding pixel during a non-selection period becomes constant, whereby a uniform display will be ensured.

Figure 9A:
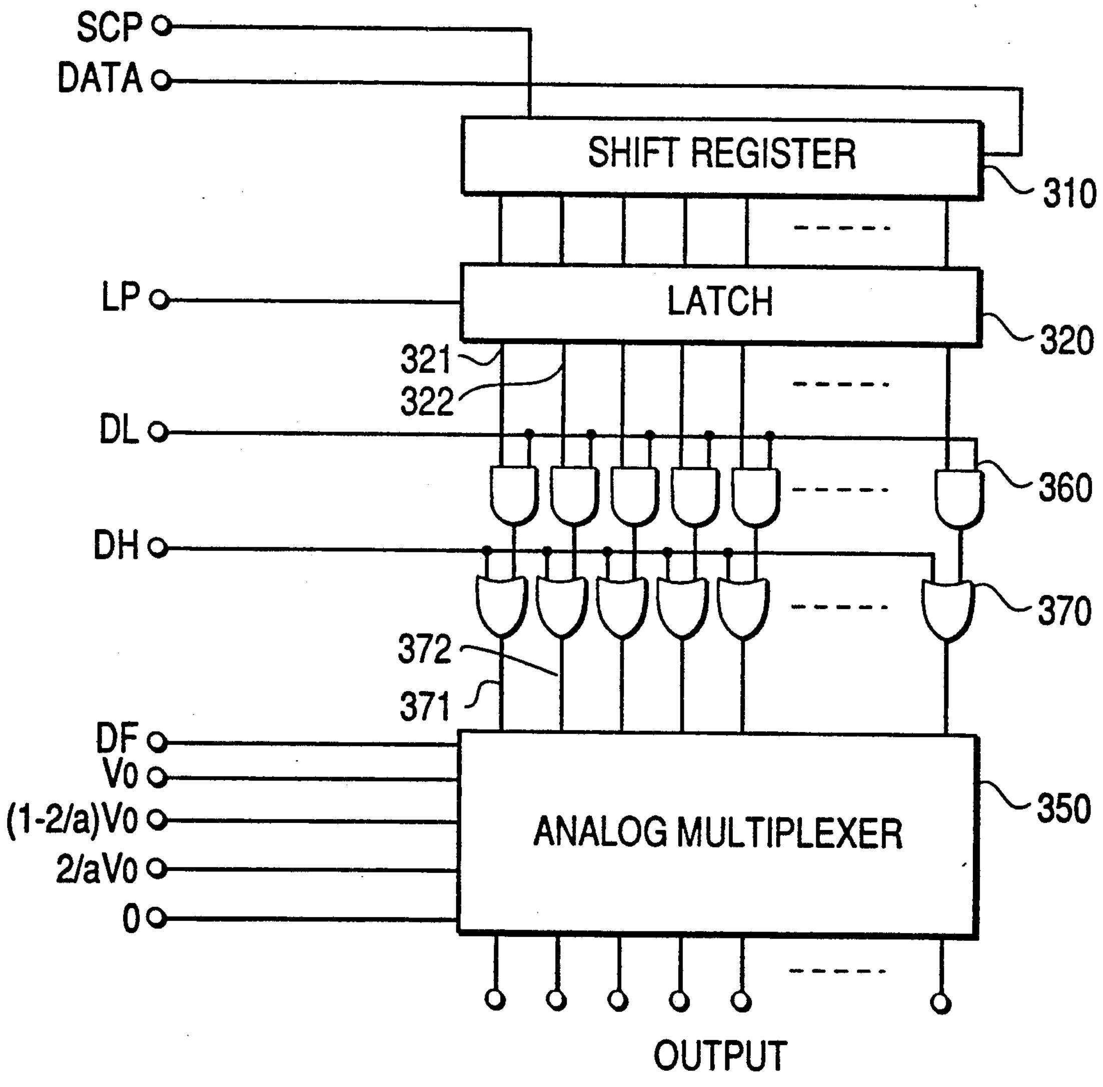
FIG. 9*a* is a block diagram showing a signal line driver of the second embodiment of the present invention.
Figure 9B:
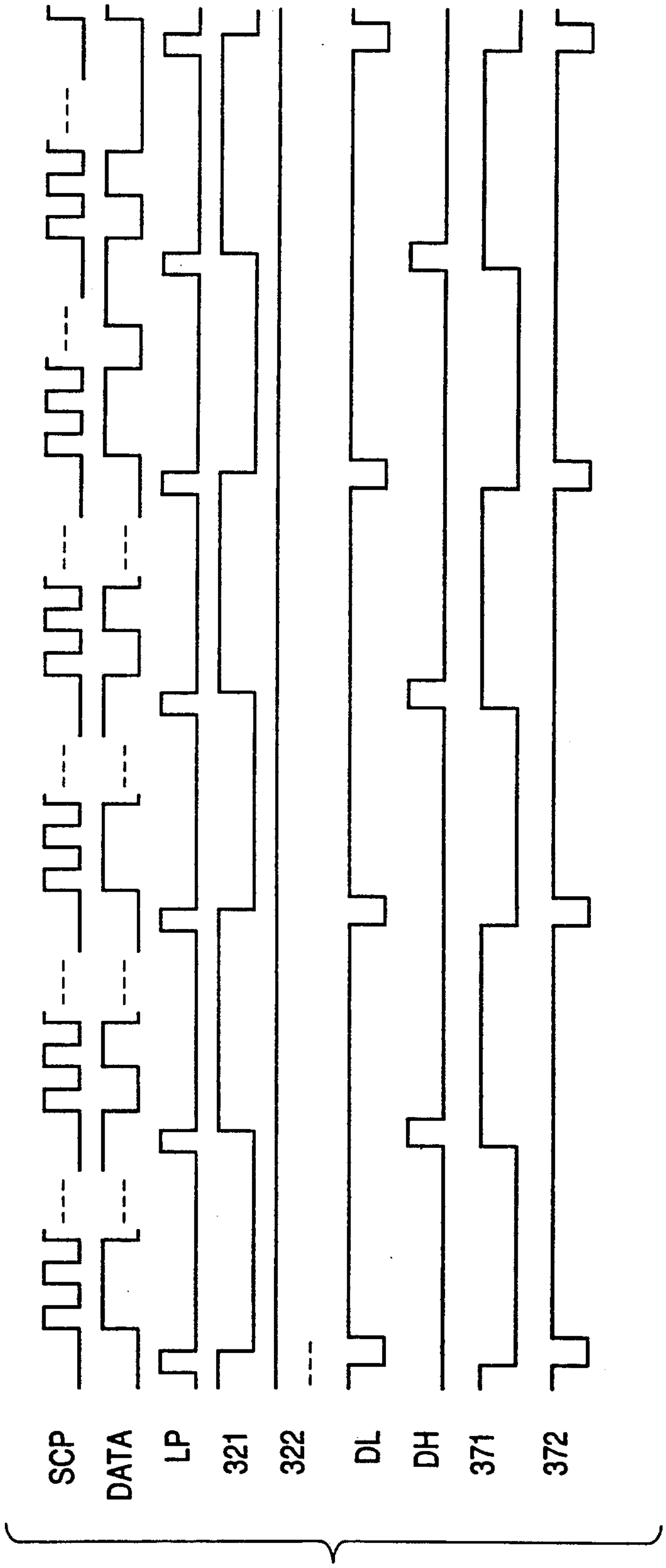
FIG. 9*b* a timing chart for explaining the operation of the signal line driver shown in FIG. 9*a;*

FIG. 9*a* is a block diagram showing a signal line driver according to the second embodiment of the present invention and FIG. 9*b* is a timing chart of the operation of the same. The signal line driver comprises a shift register 310 for sequentially shifting display data, denoted by DATA, in response to a shift clock SCP, a latch 320 for fetching the output data from the shift register 310 upon receiving a latch signal LP, an AND and an OR gates 360 and 370 for forcedly shifting the output data from the latch 320 to "H" or "L" in response to signals DL and DH, respectively, and an analog multiplexer 350 for selecting one of four driving voltages $[0, (2/a)V_O, (1-2/a)V_O, V_O]$ in accordance with both a data output of the OR gate 370 and a polarity inversion signal DF while referring to the truth table shown in FIG. 7. The waveform of the driving voltages illustrated in FIG. 8 can be realized by determining the signals DL and DH which are arranged in the waveform as shown in FIG. 9*b*.

EMBODIMENT 3

Figure 10:
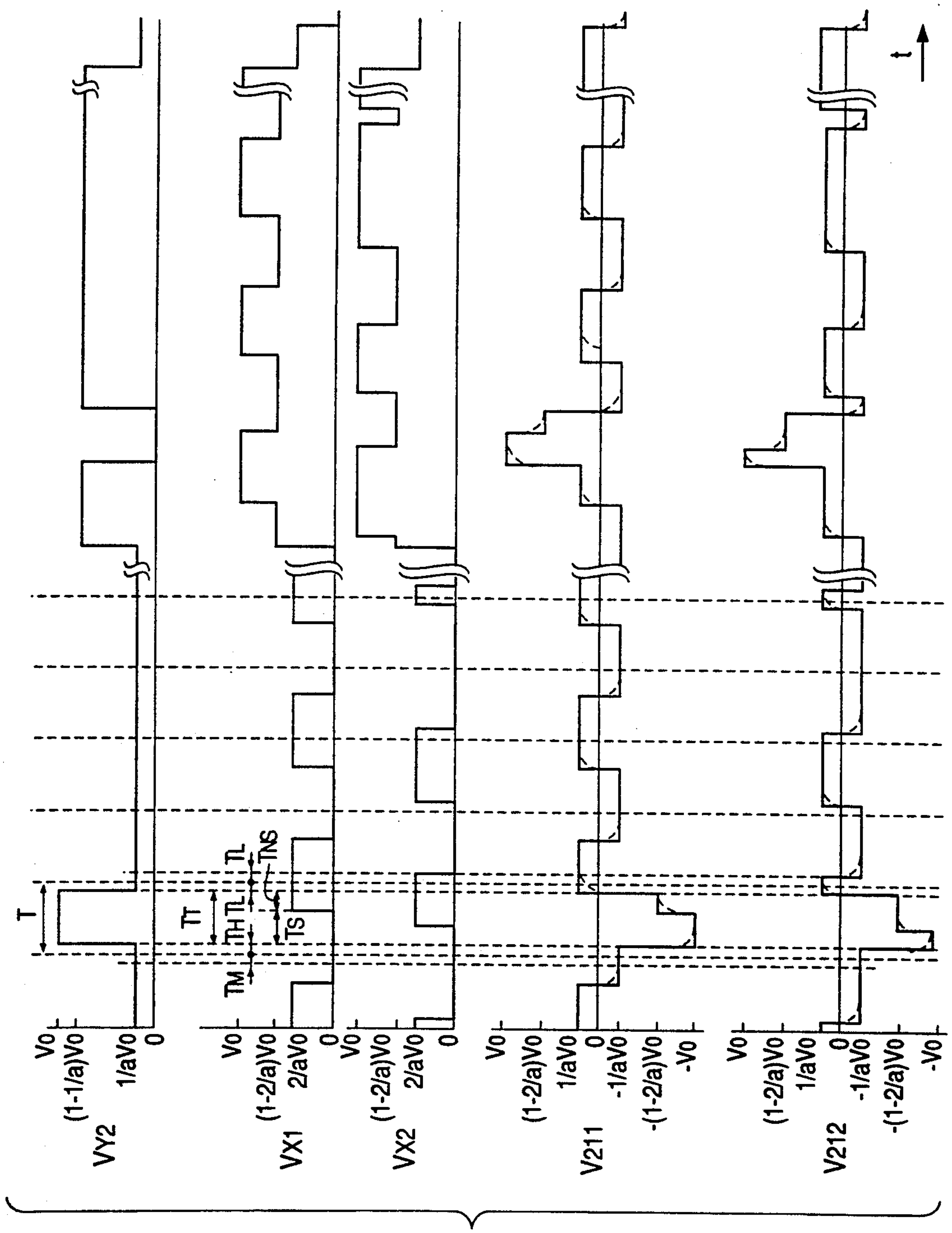
FIG. 10 is a waveform diagram of driving voltages according to a third embodiment of the present invention.

FIG. 10 is a waveform diagram of driving voltages provided for displaying the pattern shown in FIG. 1*b* according to a third embodiment of the present invention. As shown, the ON and OFF voltage application periods $T_S$ and $T_{NS}$ of signal electrode voltages for intermediate gradation display are alternated with each other in each scanning period T while both the ON and OFF voltage application periods $T_H$ and $T_L$ associated with no display data are also included as necessary. Accordingly, the change of the signal electrode application voltage during one scanning period T can be limited to a certain number (one in this embodiment) regardless of the display data so that the polarity inversion of each voltage applied to a corresponding pixel in the scanning period T becomes uniform. The effective voltage V is then obtained from:

$$V = \frac{V_0}{a}\sqrt{\frac{1}{N}\{p(ma^2 + (1-m)(a-2)^2) + 1 - p + (1-\tau)N - 1\}} \tag{10}$$

(where $m=T_S/T$ and $p=T_T/T$). The number n of polarity inversions in the driving voltage, contained in the equation (6), is expressed by N which is constant regardless of the display data. Then, the effective voltage applied to a corresponding pixel during a non-selection period becomes constant regardless of the display data so that a uniform display of intermediate gradation can be made.

Figure 11A:
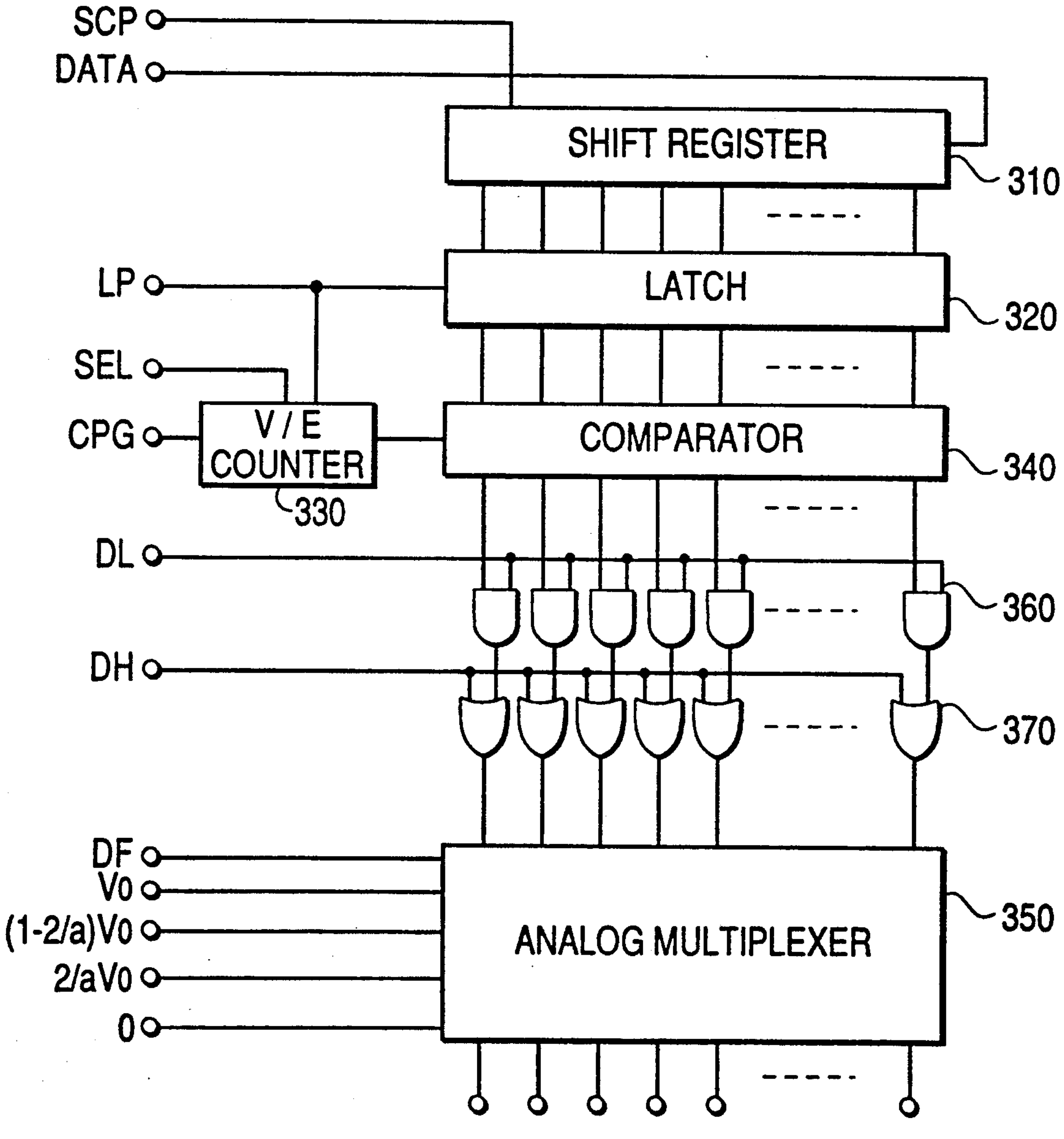
FIG. 11*a* is a block diagram showing a signal line driver of the third embodiment of the present invention.
Figure 11B:
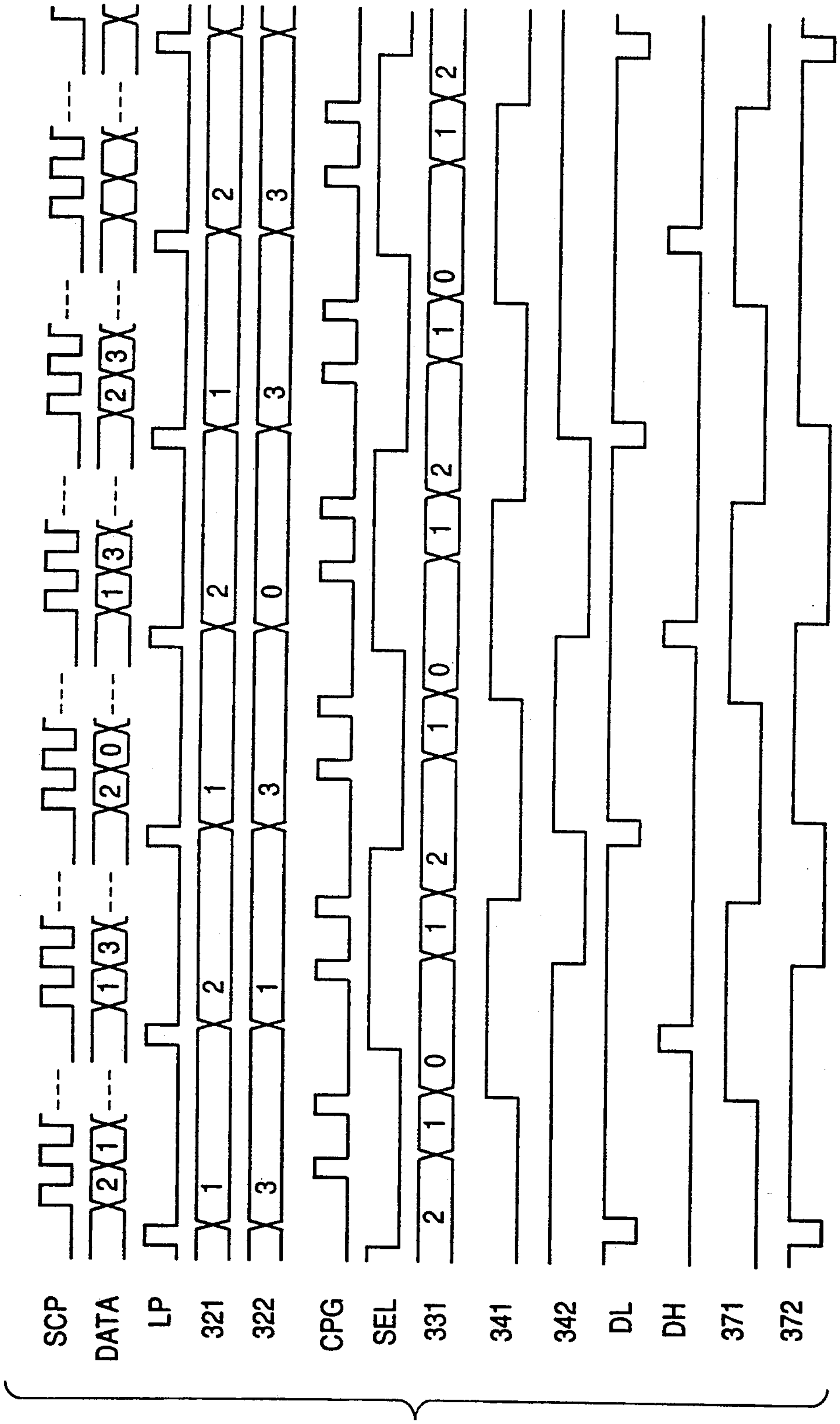
FIG. 11*b* is a timing chart for explaining the operation of the signal line driver shown in FIG. 11*a*.

FIG. 11*a* is a block diagram showing a signal line driver in the third embodiment of the present invention and FIG. 11*b* is a timing chart of the operation of the same. The signal line driver comprises a shift register 310 for sequentially shifting display data, denoted by DATA, in response to a shift clock SCP, a latch 320 for fetching the output data from the shift register 310 upon receiving a latch signal LP, a counter 330 for counting up or down gradation control signals CPG according to an up/down selector signal SEL, a comparator 340 for judging that the output data of the latch 320 is greater than that of the counter 330, an AND and an OR gates 360 and 370 for forcedly shifting the output data from the latch 320 into "H" or "L" in response to signals DL and DH, respectively, and an analog multiplexer 350 for selecting one of four driving voltages $[0, (2/a)V_O, (1-2/a)V_O, V_O]$ in accordance with both a data output of the OR gate 370 and a polarity inversion signal DF while referring to the truth table shown in FIG. 7. The waveform of the driving voltages illustrated in FIG. 10 can then be realized by switching the up/down selection signal SEL and simultaneously, determining the signals DL and DH which are arranged in the waveform as shown in FIG. 11*b*.

What is claimed is:

1. A method of driving a liquid crystal display having a liquid crystal panel including a nematic liquid crystal material interposed between a pair of substrates respectively incorporating an array of signal electrodes and an array of scanning electrodes arranged to define a plurality of pixels at intersection points therebetween, said method comprising:

applying a respective selection voltage, during a respective scanning period, to each of said scanning electrodes in succession, said selection voltage for selecting corresponding pixels defined by a scanning electrode having said selection voltage applied thereto; and, applying both an OFF voltage and an ON voltage, during each respective scanning period, to the signal electrodes defining said corresponding pixels of the scanning electrode having said selection voltage applied thereto, said ON voltage for illuminating a corresponding pixel and said OFF voltage for disilluminating the corresponding pixel;

wherein an application period of each respective selection voltage during each respective scanning period is less than a period of said respective scanning period; and, wherein one of the ON voltage and the OFF voltage is allocated to a beginning portion of a respective scanning period and the other of the ON voltage and the OFF voltage is allocated to an end portion of the respective scanning period, and wherein the allocation of the ON voltage and the OFF voltage to the beginning and end portions of the scanning period is reversed at intervals of succeeding scanning periods.

2. A method as recited in claim 1, further comprising varying an application period of the ON voltage to correspond to an intermediate gradation level and to thereby provide a display of intermediate gradation.

3. A method as recited in claim 1, further comprising inverting a polarity of a voltage applied to a pixel once during the scanning period regardless of an intended display.

* * * * *